US005854790A

United States Patent [19]
Scott et al.

[11] Patent Number: 5,854,790
[45] Date of Patent: Dec. 29, 1998

[54] METHOD AND APPARATUS FOR NETWORKING DATA DEVICES USING AN UPLINK MODULE

[75] Inventors: Craig M. Scott, Irving; Li Tung Wang, Arlington; Arthur T. Bennett; Ahmad Nouri, both of Carrollton, all of Tex.

[73] Assignee: Compaq Computer Corp., Houston, Tex.

[21] Appl. No.: 891,511

[22] Filed: Jul. 11, 1997

Related U.S. Application Data

[63] Continuation of Ser. No. 403,206, Mar. 13, 1995, Pat. No. 5,796,738.

[51] Int. Cl.⁶ .......................... H04L 12/28; H04L 12/56; H04L 12/413; G06F 15/16
[52] U.S. Cl. .................. 370/401; 370/236; 370/402; 370/408; 370/445; 395/200.72
[58] Field of Search ................................. 370/402, 236, 370/228, 408, 401, 445, 461, 235, 403, 407, 462, 230, 220, 502; 340/825.03, 825.4; 395/200.72, 200.75

[56] References Cited

U.S. PATENT DOCUMENTS

| Re. 33,426 | 11/1990 | Sugimoto et al. | 370/402 |
|---|---|---|---|
| 4,500,990 | 2/1985 | Akashi | 370/235 |
| 4,597,078 | 6/1986 | Kempf | 370/401 |
| 4,627,052 | 12/1986 | Hoare et al. | 370/402 |
| 4,737,953 | 4/1988 | Koch et al. | 370/401 |
| 4,825,435 | 4/1989 | Amundsen et al. | 370/501 |

(List continued on next page.)

FOREIGN PATENT DOCUMENTS

| 0 222 669 A2 | 5/1987 | European Pat. Off. . |
|---|---|---|
| 0 190 661 A2 | 8/1996 | European Pat. Off. . |

OTHER PUBLICATIONS

"Penril Module 2530 10Base T Concentration +Bridging", Brochure, *Penrill Datacomm Networks*, May 1992, 2 pages.
"MultiGate Product Guide 1992" Draft, *Network Resources Corporation*, 1992, pp. 1–18.
"Retix® 4760 High–Performance Local Bridge/Router" Brochure, *Retix®*, 1992, 4 pages.
"Retix® 4660 High–Performance Local Bridge" Brochure, *Retix®*, 1993, 4 pages.
"HUB 2 Input/Output Bus Block Diagram", *Picazo*, Jan. 26, 1993, 1 page.
"Product Specifications—Asanté HUB 1012" Brochure, *Asanté Technologies, Inc.*, May 1993 6 pages.
"Asanté Hub 2072" Brochure, *Asanté Technologies, Inc.*, May, 1993, 8 pages.
"Asanté View" Brochure, *Asanté Technologies, Inc.*, May 1993, 4 pages..
"DAVID ExpressNet® Workgroup Hubs" Brochure, *DAVID Systems Incorporated*, May, 1993, 2 pages.
William B. Urinoski, "NetMetrix", *The X Journal*, May–Jun., 1993, 2 pages.
"HP NetMetrix" Advertisement, *Hewlett® Packard*, Source Unknown, Date Unknown, 2 pages.

(List continued on next page.)

Primary Examiner—Jason Chan
Assistant Examiner—Melissa Kay Carman
Attorney, Agent, or Firm—Jenkins & Gilchrist

[57] ABSTRACT

A network (10) includes several local networks (32, 34, 36). Each local network (32, 34, 36) includes a repeater (12, 16, 20) coupled to data devices (14, 18, 22). The combination of the repeater (12, 16, 20) and the data devices (14, 18, 22) form a collision domain for managing communications within the local network (32, 34, 36). Uplink modules (40, 44) manage communications between the local networks (32, 34, 36) by isolating collision domains and generating collision indications when messages cannot be transmitted. The uplink modules (40, 44) may also implement bridging, routing, or filtering capabilities that inhibit transmission of an intra-network message beyond its local network (32, 34, 36).

13 Claims, 4 Drawing Sheets

U.S. PATENT DOCUMENTS

| | | | |
|---|---|---|---|
| 4,901,312 | 2/1990 | Hui et al. | 370/403 |
| 4,922,503 | 5/1990 | Leone | 370/402 |
| 4,982,400 | 1/1991 | Ebersole | 370/407 |
| 5,050,165 | 9/1991 | Yoshioka et al. | 370/401 |
| 5,060,228 | 10/1991 | Tsutsui et al. | 370/402 |
| 5,088,032 | 2/1992 | Bosack | 395/200.72 |
| 5,111,453 | 5/1992 | Morrow | 370/401 |
| 5,179,554 | 1/1993 | Lomicka et al. | 370/257 |
| 5,214,646 | 5/1993 | Yacoby | 370/402 |
| 5,251,213 | 10/1993 | Videlock et al | 370/403 |
| 5,299,195 | 3/1994 | Shah | 370/462 |
| 5,301,303 | 4/1994 | Abraham et al. | 395/500 |
| 5,329,618 | 7/1994 | Moati et al. | 395/200.75 |
| 5,343,471 | 8/1994 | Cassagnol | 370/401 |
| 5,379,289 | 1/1995 | DeSouza et al. | 370/230 |
| 5,387,902 | 2/1995 | Lockyer et al. | 340/825.03 |
| 5,396,495 | 3/1995 | Moorwood et al. | 370/408 |
| 5,414,708 | 5/1995 | Webber et al. | 370/445 |
| 5,434,872 | 7/1995 | Petersen et al. | 371/57.1 |
| 5,436,617 | 7/1995 | Adams et al. | 340/825.4 |
| 5,550,836 | 8/1996 | Albrecht et al. | 370/461 |
| 5,680,389 | 10/1997 | Douglas et al. | 370/228 |

OTHER PUBLICATIONS

HP Probe View/SNMP for Open View and LanProbe II Segment Monitors Brochure, *Hewlett® Packard*, 1993, pp. 1–8.

"Networking Products" Brochure, *DAVID Systems Incorporated*, Jul., 1993, 4 pages.

"Channel One Open Networking Enterprise Newsletter", *Retix®*, Fall, 1993, pp. 1–12.

MultiGate® Hub 2" Brochure, *Network Resources Corporation*, Dec., 1993, 2 pages.

MultiGate ® Hub 1w" Brochure, *Network Resources Corporation*, Dec., 1993, 2 pages.

"NRC Fault Tolerant LAN Architecture" Brochure, *Network Resources Corporation*, Date Unknown, 4 pages.

"Multigate Hub 1 +" Brochure, *Network Resources Corporation*, Date Unknown, 1 page.

"Multigate Hub 2 — WAN Version" Brochure, *Network Resources Corporation*, Date Unknown, 1 page.

"The Asanté Bridge 1012 Hardware Module Features" Brochure, *Asanté*, Date Unknown, 2 pages.

"IEEE 802.3/Ethernet Twisted Pair Products 10Base–T Standard Compatible" Brochure, *Cabletron Systems, Inc.*, Date Unknown, pp. 1–12.

"Cisco Router Module" Brochure, *Cabletron Systems, Inc.*, Date Unknown, 4 pages.

"82300 MainStreet® Ethernet little Bridge" Brochure, *Newbridge Networks, Inc.*, Date Unknown, 2 pages.

Letter from James P. McNaul, President and CEO of Fastlan Solutions to John F. McHale, President and CEO of Net-Worth, Inc., with attached "Fastbridge™ 1200 Two–Port 10/100 Mbps Ethernet Bridge" Brochure, Jan. 31, 1995, 4 pages.

ANSI/IEEE Std 802.3 Draft Supplement–MAC Parameters, Medium Attchment Units, Repeater 10/100 Mbps Operation (version 3.0), *IEEE Standards Department*, 1994, 212 pages.

"NetWorth™ 100 Base–T Cabling and Configuration" Brochure, 1995, 4 pages.

"PowerPipes Ethernet/FDDI Switching Hub Client/ Server Switching" Networth Switching White Paper; *Networth*; 1993, pp. 1–8.

"PowerPipes Ethernet/FDDI Switching Hub Client/Server Switching—NetWorth Switching White Paper", *NotWorth™*, 1993, pp. 1–8.

"NetWorth's Network Management Strategy", *NetWorth™*, Date Unknown, pp. 1–15.

Fast Ethernet Stategy—Revision 1.0" Brochure, *NetWorth™*, 1995, 4 pages.

Micro100™ Fast Ethernet Hub —Product Information Sheet Rev. 2.0" Brochure, *NetWorth™*, Date Unknown, 2 pages.

"Gary Gunnerson, Network Switching Hubs—Switching to the Fast Track", *PC Magazine*, October 11, 1994, 6 pages.

Scott Bradner, "Network for Client/Server Computing—The Bradner Bridge Report", *CMP Publications, Inc.*, October 1994, 4 pages.

Networth's Legacy of NetWare Optimization, NetWorth™, Date Unknown, pp. 1–14.

"Building Bandwidth: A White Paper on Designing Segmented Ethernet Networks"; Date Unknown; pp. 1–12.

Saunders, Stephen, *HP Eyes an Early Lead in the 100–Mbit/s LAN Derby*, 8178 Dat Communications 23 (1994) May, No. 7, New York, US pp. 37–38.

"Penril Series 2000 Overview" Brochure, *Penril Datacomm Networks*, May 1992, 4 pages.

"Penril Series 2500 Overview" Brochure, *Penril Datacomm Networks*, May 1992, 4 pages.

METHOD AND APPARATUS FOR NETWORKING DATA DEVICES USING AN UPLINK MODULE

This application is a continuation of Application Ser. No. 08/403,206, filed Mar. 13, 1995 issued on Aug. 18, 1998.

TECHNICAL FIELD OF THE INVENTION

This invention relates to the field of networking data devices, and more particularly to a method and apparatus for networking data devices using an uplink module.

BACKGROUND OF THE INVENTION

Ethernet is a common communications standard used in local area networks (LANs) to share information among computers, printers, modems, and other data devices. A traditional Ethernet network operates at transmission rates of 10 megabits per second (Mbps), but there is currently a move in the networking industry toward higher capacity 100-Mbps networks. The ten-fold increase in data transmission bandwidth creates new message collision problems that severely limit the size and line lengths of the network.

Both Ethernet (10-Mbps) and Fast Ethernet (100-Mbps) employ an industry standard method of accessing the network wire called Carrier Sense Multiple Access with Collision Detection (CSMA/CD). CSMA specifies that Ethernet data devices listen to the network to ensure that the line is idle before transmitting. Whenever two or more devices transmit simultaneously, an error condition called a collision occurs. To ensure that the network recovers from the condition, both the Ethernet and Fast Ethernet specifications include a recovery scheme called collision detection (CD).

Both Ethernet and Fast Ethernet specifications limit the line lengths and number of repeaters. This is due to the maximum allowable propagation delay of a message packet from a transmitting data device to a receiving data device. Increasing the transmission rate can impose additional limitations on network configuration. Therefore, a need has arisen for a topology that offers enhanced collision detection capabilities and improved performance for larger and more reliable networks.

SUMMARY OF THE INVENTION

In accordance with the present invention, the disadvantages and problems associated with collision detection in networks has been substantially reduced or eliminated. One aspect of the present invention provides an uplink module that generates a collision indication between two local networks in order to increase the allowable size and line lengths of a network.

According to an embodiment of the present invention, a system for communicating data includes a transmitting data device that generates a message for transmission to a receiving data device. A first repeater is coupled to the data device and has an uplink module with a buffer disposed between the transmitting data device and the receiving data device, wherein the buffer stores message data for transmission to the receiving data device. A second repeater is coupled to the uplink module of the first repeater and the receiving data device. The uplink module in the first repeater receives at least a portion of the message generated by the transmitting data device and initiates transmission of a collision indication to the transmitting data device in response to a predetermined quantity of message data stored in the buffer.

According to another embodiment of the present invention, a method for detecting a data collision in a network of data devices includes initiating transmission of a message from a data device. At least a portion of the message is received at an uplink module. A collision indication is generated in response to a predetermined quantity of message data stored in a buffer of the uplink module. The data device is informed of the collision indication.

Important technical features of the present invention include the ability to increase the coverage of a network without introducing the need for additional bridging and routing devices. Specifically, the present invention enhances the coverage and configuration flexibility of both Ethernet and Fast Ethernet networks. Another technical advantage of the present invention is the use of uplink modules to create a hierarchy of local networks, which define any number of independent message collision domains. These uplink modules reduce transmission delays caused by traditional bridges and routers, and substantially reduce or eliminate the occurrence of dropped and conflicting messages.

Other technical advantages of the present invention include the implementation of a buffer to manage transmission of messages through the uplink module. Buffering of message data allows the uplink module to quickly dispatch messages when activity is low, and to generate a collision indication when the buffer is saturated with message data to be delivered. Because at least a portion of the message is stored in the uplink module buffer to generate the collision indication, the present invention also provides a convenient way to read destination addresses of messages to perform intelligent bridging, routing, or filtering functions.

BRIEF DESCRIPTION OF THE DRAWINGS

For a more complete understanding of the present invention and for further features and advantages, reference is now made to the following description taken in conjunction with the accompanying drawings, wherein like reference numerals represent like parts, in which.

DETAILED DESCRIPTION OF THE INVENTION

Figure 1:
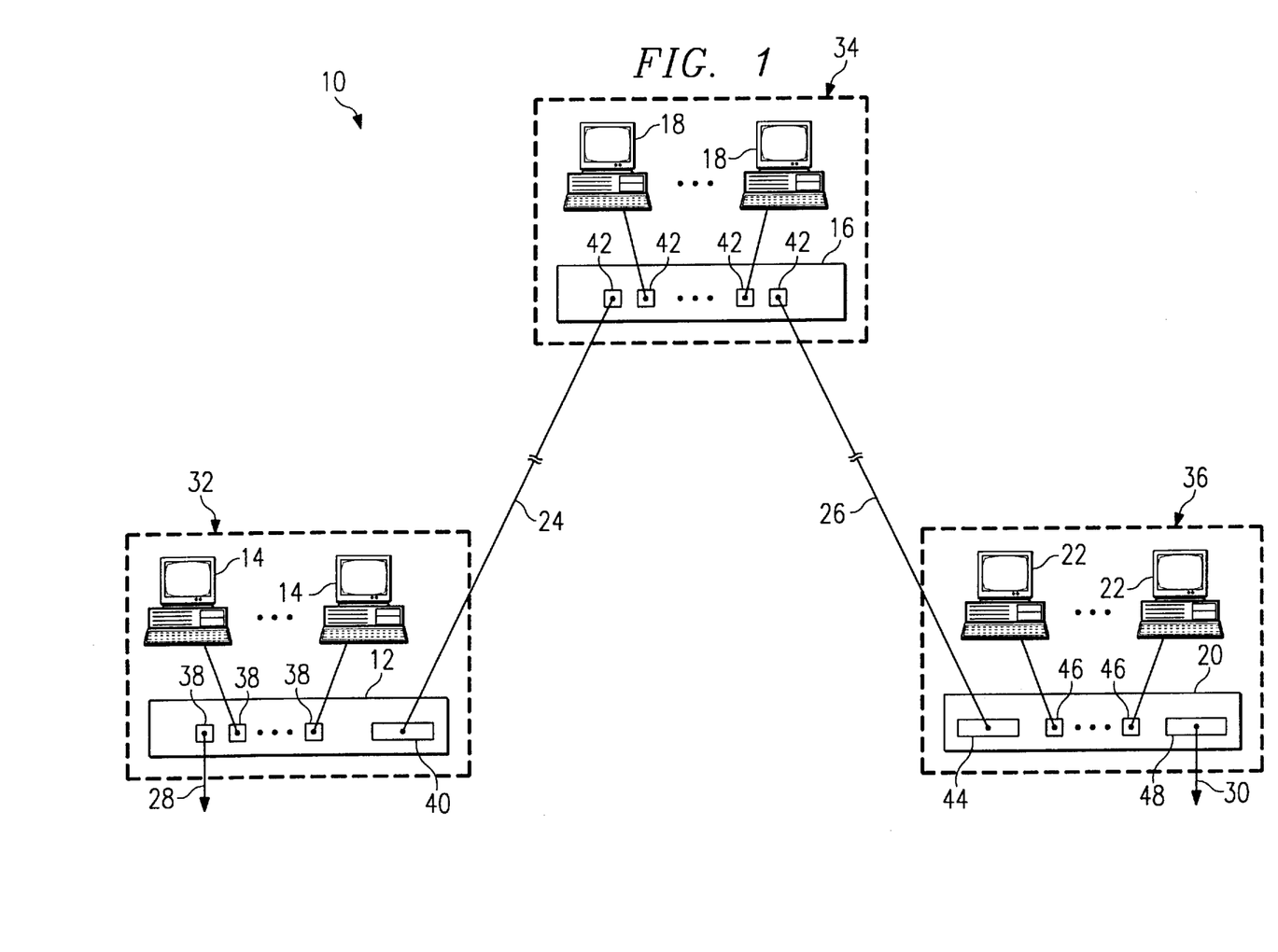
FIG. 1 illustrates a network of data devices.

FIG. 1 illustrates a network 10 for interconnecting a plurality of data devices. Repeater 12 services data devices 14, repeater 16 services data devices 18, and repeater 20 services data devices 22. Repeater 12 couples with repeater 16 over inter-repeater link (IRL) 24, and repeater 16 couples with repeater 20 over IRL 26. Repeaters 12 and 20 couple with other repeaters (not shown) over IRL 28 and 30, respectively.

Data devices 14, 18, and 22, represented collectively by exemplary data devices 14, include any source or destination of data connected to network 10. Data device 14 is any type of data terminal equipment (DTE) that allows either input or output of data. For example, data device 14 can be a computer, workstation, file server, modem, printer, or any other device that can receive or transmit data in network 10.

Each repeater in network 10 services a plurality of data devices in its local network. For example, repeater 12 and data devices 14 combine to form local network 32. Similarly, repeater 16 and data devices 18 form local network 34, and repeater 20 and data devices 22 form local network 36. It should be understood that repeaters 12, 16, and 20 represent one or more physical repeaters coupled together in local networks 32, 34, and 36. IRL 24 and IRL 26 couple local networks 32, 34, and 36 into overall communications network 10. It should be understood that the term "local network" is not the same as a local area network (LAN). "Local network" refers to a collection of communications devices that combine to form an independent collision domain.

Within local network 32, data devices 14 couple to local ports 38 of repeater 12. Data generated at one data device 14 is received at one of local ports 38 of repeater 12 and then retransmitted to the other local ports 38 coupled to the other data devices 14 of local network 32. One of local ports 38 couples to IRL 28 for connection to another local network. Repeater 12 includes an uplink module 40 to couple local network 32 to local network 34. Specifically, IRL 24 provides a link between uplink module 40 of repeater 12 and one of local ports 42 of repeater 16.

Other local ports 42 of repeater 16 couple with data devices 18 to form local network 34. Repeater 16 receives data at one of local ports 42, connected to IRL 24, IRL 26, or data devices 18, and retransmits this data to the other local ports 42. Repeater 16, unlike repeater 12, does not contain an uplink module.

One of local ports 42 of repeater 16 couples with uplink module 44 of repeater 20 over IRL 26 to connect local network 34 and local network 36. Repeater 20 includes uplink module 44, local ports 46, and uplink module 48. Repeater 20 receives data from uplink module 44, uplink module 48,. or local ports 46 and retransmits the data to the other uplink modules or local ports of repeater 20. Uplink module 48 couples with IRL 30 for connection to another local network.

Network 10 operates as a data communications network, such as an Ethernet network operating at a 10-Mbps transmission rate or a Fast Ethernet network operating at a 100-Mbps transmission rate. Each local network 32, 34, and 36 uses a standard messaging method called Carrier Sense Multiple Access with Collision Detection (CSMA/CD), which is described in detail in the ANSI/IEEE Standard 802.3u Draft Supplement entitled "MAC Parameters, Medium Attachment Units, and Repeater for 100 Mb/s Operation (version 3.0)."

Each local network 32, 34, and 36, represented by exemplary local network 32, implements standard collision detection locally to ensure that more than one data device 14 does not simultaneously transmit data. If two data devices 14 transmit-data at the same time, repeater 12 detects a collision and broadcasts a jam signal. Transmitting data device 14 then executes a back off procedure, waits a random period of time, and begins the listen and transmit procedure again. Transmitting data device 14 can also sense a different message or a garbled message on its receive line while transmitting a message. This would also cause a collision condition and cause transmitting data device 14 to cease transmission and execute back off procedures.

The amount of time it takes for data to propagate within local network 32 between data devices 14 is called a propagation delay. The propagation delay includes both delays for transmitting the message over a length of wire, fiber optic cable, or other suitable medium at the speed of electromagnetic waves in the selected medium, as well as delays in one or more repeaters 12 to receive and retransmit the message. When a collision condition occurs, there is an additional delay for the jam signal to reach the transmitting data device 14. In order for standard CSMA/CD to work within local network 32, the time to detect a collision, which can be up. to two times the propagation delay, should not exceed the time to transmit the minimum size message packet, such as a 512-bit message. Otherwise, data device 14 might transmit a complete message packet before receiving notification that a collision occurred.

The slow transmission rate of traditional Ethernet networks (10-Mbps) allows as many as four repeaters and five hundred meters of twisted pair wire length between data devices 14 in local network 32. A 100-Mbps transmission rate, using the same collision detection and message lengths, severely limits the number of repeaters and line lengths between data devices 14. The IEEE 802.3 Fast Ethernet specification only allows two repeaters 12 and two-hundred and five meters of comparable copper wire length between data devices 14 of local network 32. For larger and more complicated networks, the limited configuration of both Ethernet and Fast Ethernet networks is unsatisfactory.

One approach to increase the coverage and size of a network uses bridges and routers between segments of the network. Network segmentation using bridges or routers, in addition to adding significant expense and complication, introduces two significant problems. First, traditional bridges and routers impose severe transmission delays while processing each message for delivery to the appropriate destination. Furthermore, bridges and routers can drop messages or send conflicting and garbled messages when network activity is high. These conditions cause a time-out error at a transmitting data device, which severely degrades network performance.

The present invention overcomes the limitations of Ethernet and Fast Ethernet configuration limitations, as well as the problems associated with bridges and routers, to extend the coverage of network 10. This is accomplished by using uplink modules 40 and 44 to partition network 10 into separate local networks 32, 34, and 36. Each local network 32, 34, and 36 maintains and manages its own collision domain using traditional CSMA/CD techniques. Uplink modules 40 and 44 manage the communication of messages across the collision domain boundaries of local networks 32, 34, and 36. Specifically, uplink modules 40 and 44 both store message data in buffers and generate collision indications to manage the boundaries between collision domains of local networks 32, 34, and 36.

IRL 24 couples uplink module 40 of repeater 12 with one of local ports 42 of repeater 16 to form a collision domain boundary between local network 32 and local network 34. IRL 26 couples one of local ports 42 of repeater 16 with uplink module 44 of repeater 20 to form a collision domain boundary between local network 34 and local network 36. Each IRL 24 and 26 includes at least one uplink module 40 and 44 to manage the communication of messages between adjacent local networks 32, 34, and 36. Uplink modules 40 and 44 temporarily store messages in buffers, which isolate the collision domain of local networks 32, 34, and 36. Uplink modules 40 and 44 also generate a collision indication when their buffers are full which could include generating a collision with any message initiated by another transmitting device or generating messages that would collide with messages initiated by another transmitting device. This collision indication to prevent initiation of transmission of messages that cannot be stored and forwarded to another local network.

Local network 34 appears as a single node in the collision domain of local network 32. Likewise, local t network 32 appears as a single node in the collision domain of local network 34. Local network 34 appears as a single node in the collision domain of local network 36. Likewise, local network 36 appears as a single node in the collision domain of local network 34. Transmitting data device 14 does not contend with the propagation delay of network 10 when uplink module 40 forwards its messages to local network 34. Instead, transmitting data device 14 need only contend with propagation delays within its local network 32.

Network 10 can support any number of local networks. For example, using category three or five unshielded twisted pair cabling in a 100-Mbps network, the line length between data device 14 and repeater 12, as well as the line length of IRL 24, can be at least one hundred meters. Longer line lengths are possible with other higher propagation constant transmission media, such as fiber optic cabling. Furthermore, full-duplex communications between uplink modules 40 and 44 using fiber optic cabling can increase the distance between local networks to two kilometers, as described below with reference to FIG. 2. Each local network 32, operating under IEEE 802.3 Fast Ethernet specifications and using category three or five unshielded twisted pair cabling, may contain up to two repeaters five meters apart, and provide a total local network propagation path of two-hundred and five meters between data devices.

To communicate an intra-network message, such as a message between two data devices 14 of local network 32, network 10 implements industry standard CSMA/CD techniques in the collision domain of local network 32. However, to communicate an inter-network message, such as a message between data device 14 and data device 18, network 10 utilizes uplink module 40 and IRL 24.

Figures 4, 6:
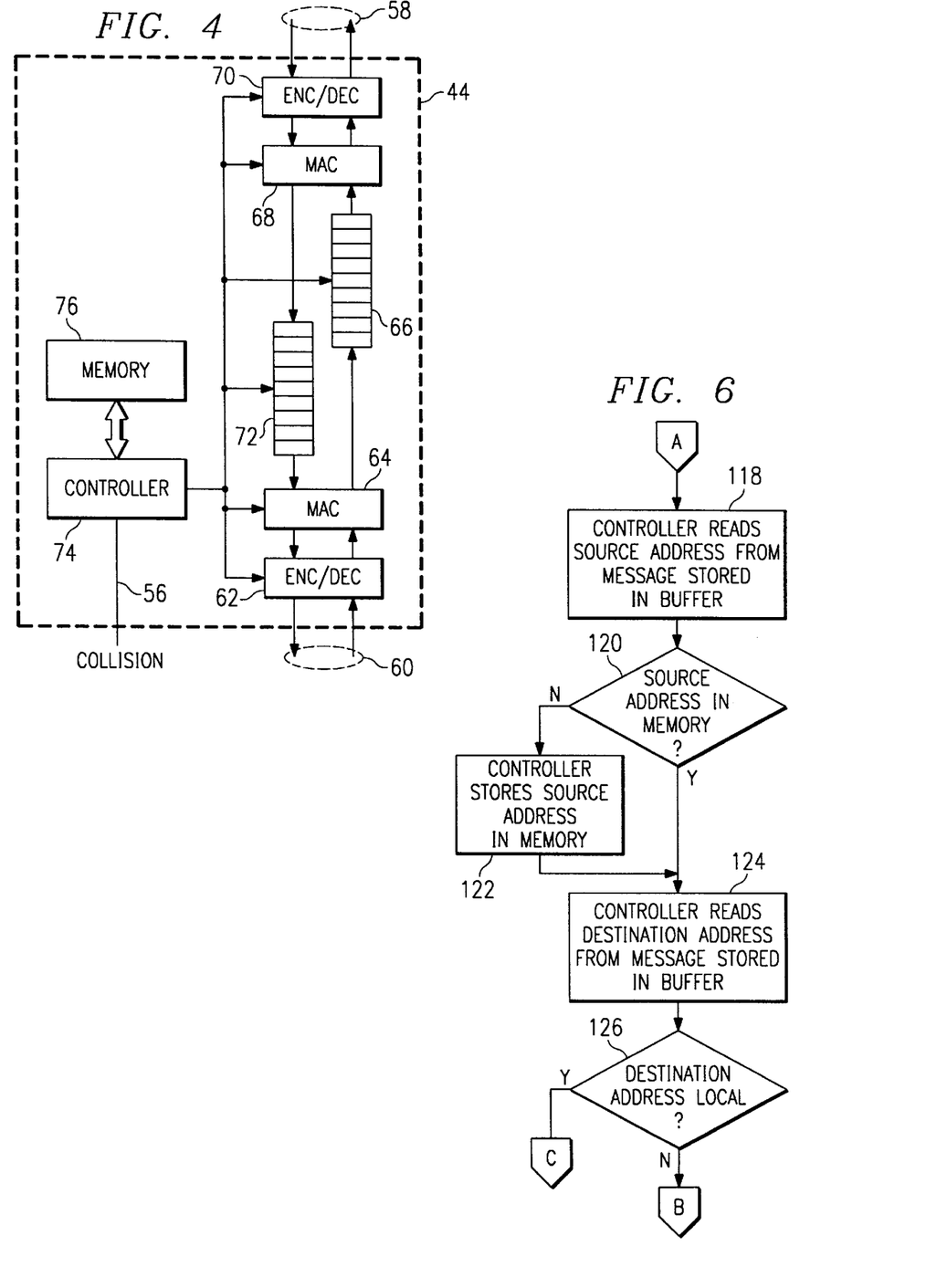
FIG. 4 is a schematic representation of an uplink module.
FIG. 6 is a flow chart of a method of bridging, routing, or filtering in the uplink module.

Data device 14 initiates transmission of an internetwork message upon detecting no activity within local network 32. Repeater 12 receives the message, conditions the signal, and retransmits the message over the remaining local ports 38 and uplink module 40. Uplink module 40 determines if it has room to store the message in its buffer (FIG. 4). If there is no room in its buffer, uplink module 40 generates a collision indication, usually in the form of a jam signal, that informs transmitting data device 14 to stop transmission and to execute a back off procedure, which includes waiting a random period of time before retransmitting the message. If uplink module 40 determines there is room to store the message in its buffer, the message is stored. Uplink module 40 transmits the message over IRL 24 by emulating the operation of data device 18 in local network 34. Repeater 16 receives the message on one of local ports 42 and retransmits the message to data device 18.

Communication of a message between data device 14 and data device 22 of local network 36 proceeds in a similar fashion. Transmitting data device 14 initiates transmission of the message through repeater 12 to uplink module 40, which then determines if it has room in its buffer to store the message. If uplink module 40 determines the message cannot be stored in the buffer, a collision indication is generated and data device 14 is informed. If uplink module 40 determines the message can be stored in its buffer, the message is stored and then passed over IRL 24 to one of local ports 42 of repeater 16. Repeater 16 retransmits the message over one of local ports 42 coupled to IRL 26, which is received at uplink module 44 of local network 36.

Uplink module 44 determines if it has room in its buffer to store the message received from local network 34. If uplink module 44 determines the message cannot be stored in its buffer, then a collision indication is transmitted to repeater 16. If uplink module 44 determines the message can be stored in its buffer, the message is stored in the buffer and then passed to repeater 20. Repeater 20 broadcasts the message over local ports 46 to data device 22.

Figure 2:
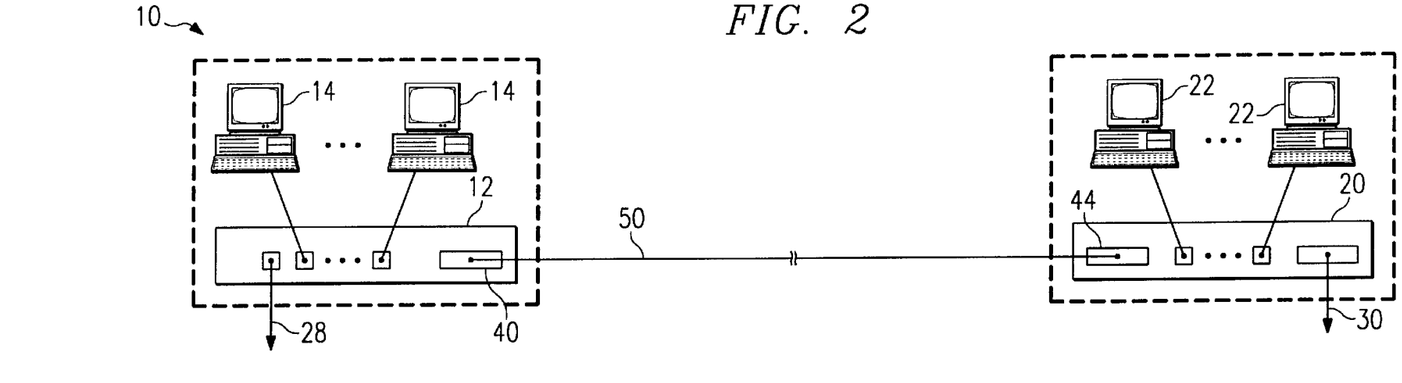
FIG. 2 illustrates an alternative embodiment of a network of data devices.

FIG. 2 shows an alternative embodiment of network 10 that couples uplink module 40 of repeater 12 to uplink module 44 of repeater 20 over duplex inter-repeater link (DIRL) 50. Because messages can pass bidirectionally over DIRL 50 without collision, the distance between uplink modules 40 and 44 depends primarily on the strength of the signal instead of the propagation delay. For example, using full-duplex fiber optic cabling, the distance between uplink modules 40 and 44 can be extended to two kilometers. DIRL 50 provides service over longer line lengths, such as between buildings in a campus network environment. Network 10 also supports additional expansion over IRL 28 or an additional DIRL 30.

Flow control of communications over DIRL 50 uses a shortened control token or message, called a runt packet. When the buffer of uplink module 40 is full and can no longer store messages received from uplink module 44, uplink module 40 transmits a runt packet to uplink module 44. Upon receipt of a runt packet, uplink module 44 stops transmitting messages to uplink module 40. If messages for delivery to uplink module 40 fill the buffer of uplink module 44, uplink module 44 generates a collision indication for transmission to devices coupled to repeater 20. Uplink module 44 can implement bridging, routing, or filtering to discard any messages not destined for local network 32 in order to clear buffer space.

Uplink modules 40 and 44 can utilize timers to determine when to begin retransmitting messages after receipt of a runt packet. For example, uplink module 40 can start a timer (TIME1) when it sends a runt packet to module 44. After TIME1 expires, uplink module 40 retransmits a runt packet if its buffer is still full. Upon receipt of a runt packet, uplink module 44 starts its own timer (TIME2), where TIME2 is greater than TIME1. After TIME2 expires and no new runt packet has been received from uplink module 40, then uplink module 44 resumes transmission of messages over DIRL 50 to uplink module 40.

Figure 3:
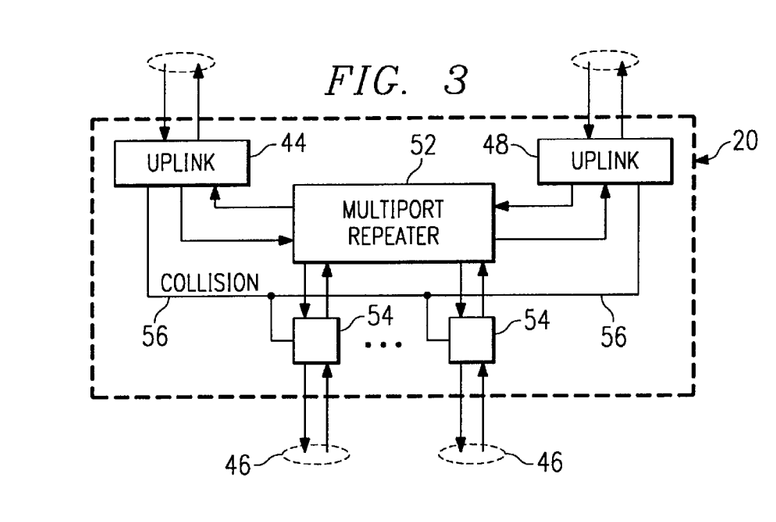
FIG. 3 is a schematic representation of a repeater with uplink modules.

FIG. 3 shows in greater detail one embodiment of repeater 20 that includes uplink modules 44 and 48. It should be understood that the present invention contemplates any number of uplink modules 44 and 48 integrated with repeater 20. Repeater 20 also includes multiport repeater 52 coupled to a plurality of port transceivers 54.

Local ports 46 attach data devices 22 in local network 36 to repeater 20. Port transceivers 54 transmit data to and receive data from data devices 22. Port transceivers 54 receive data from data devices 22 as a series of symbols, decode the symbols into bits, and present the bits of information to multiport repeater 52. Port transceivers 54 receive data from multiport repeater 52 as bits of information, encode the bits into symbols, and transmit the symbols over local ports 46 to data devices 22.

Multiport repeater 52 receives data from port transceivers 54 or uplink modules 44 and 48 and retransmits the data to all other components attached to multiport repeater 52, except for the component that originated the data. For example, message data from data device 22 arrives at multiport repeater 52 through port transceiver 54, and multiport repeater 52 retransmits the data to the other port transceivers 54 and both uplink modules 44 and 48.

Similarly, multiport repeater 52 receives message data from uplink module 44, and retransmits this data to all port transceivers 54 and uplink module 48. Multiport repeater 52, ignoring time delays and signal conditioning functions, can be modelled approximately as a duplex wire coupling together uplink module 44, uplink module 48, and all port transceivers 54 of repeater 20.

Multiport repeater 52 also performs signal conditioning functions, such as reconstruction of the message preamble to ensure proper synchronization at the receiving data device. Multiport repeater 52 also implements standard CSMA/CD messaging techniques within the collision domain of local network 36.

Uplink modules 44 and 48 manage the collision domain boundary between local network 36 and other adjacent local networks. Uplink modules 44 and 48 are also coupled to multiport repeater 52 in a similar fashion as port transceivers 54. Uplink module 44 emulates operation of data device 22 and generates a collision indication upon determination that it cannot communicate a message between local network 34 and local network 36.

When transmitting data device 22 initiates transmission of a message to data device 18, uplink module 44 can inform transmitting data device 22 of a collision in two ways. First, uplink module 44 can transmit a collision signal over collision line 56 to port transceivers 54. Upon receipt of a collision signal, port transceivers 54 generate a jam signal to broadcast over local ports 46 to data devices 22. A jam signal can be any communication received by data device 22 while transmitting a message. Similarly, uplink module 48, in response to a collision signal on collision line 56, can also generate a jam signal for broadcast to an adjacent local network.

Alternatively, uplink module 44 can indicate a collision by generating a jam signal locally. Multiport repeater 52 then receives and retransmits the jam signal to port transceivers 54 and uplink module 48. By either generating a collision signal on collision line 56 or locally generating a jam signal for broadcast to other components of repeater 20, uplink module 44 informs transmitting data device 22 that the message cannot be delivered. Transmitting data device 22 stops transmission and executes a back off procedure that specifies retransmission of the message after waiting a random period of time.

FIG. 4 illustrates in greater detail uplink module 44 in repeater 20 that manages the collision domain boundary between local network 36 and local network 34. Uplink module 44 includes link 58 associated with an external uplink port of repeater 20 for communication with local network 34 over IRL 26. Link 60, associated with an internal local port within repeater 20, provides communication between uplink module 44 and multiport repeater 52. For clarity, links 58 and 60 are shown as separate bidirectional lines, but it should be understood that links 58 and 60 represent any form of duplex communication, whether performed over a single line using a multiplexing technique, such as time division or frequency division multiplexing, or over many lines.

Message data from multiport repeater 52 arrives at uplink module 44 over link 60 and passes to encoder/decoder 62, which translates the message data from symbols into bits of information. Media access controller (MAC) 64 converts the serial bits of information into parallel format and places the message data in buffer 66. MAC 68 reads data from buffer 66, encodes the data, and once it determines that link 58 is available for transmission, MAC 68 serializes the encoded data, and passes this data to encoder/decoder 70 to translate into line level voltages. This data is transmitted over link 58 and IRL 26 to local network 34.

Similarly, message data received from local network 34 over IRL 26 arrives at encoder/decoder 70 from link 58. MAC 68 receives bits of information from encoder/decoder 70, performs serial to parallel conversion, and places the message data in buffer 72. MAC 64 reads data from buffer 72, translates the data into serial format, and passes the data to encoder/decoder 62. The message data is then transmitted over link 60 to multiport repeater 52.

Although buffers 66 and 72 are shown as separate components of uplink module 44, it should be understood that buffers 66 and 72 can be implemented in a single device, such as a first-in first-out (FIFO) memory or SRAM or DRAM device. In one embodiment, buffers 66 and 72 are implemented together in a sixteen kilobyte FIFO memory, which provides eight kilobytes of storage for both the incoming and outgoing message data. Assuming a maximum standard 1518-byte Ethernet message packet, buffers 66 and 72 can hold up to five message packets before saturating. Buffers 66 and 72 and memory 76 can be implemented in a single device or separate devices.

Controller 74 manages the operation of each component of uplink module 44. Memory 76 coupled to controller 74 stores operational instructions, boot up and diagnostic routines, and address tables for intelligent bridging, routing, or filtering functions, as described below.

One important aspect of controller 74 is the generation of a collision indication when uplink module cannot transmit a message. Controller 74 sends a collision signal over collision line 56, which causes port transceivers 54 to broadcast jam signals over local ports 46 to data devices 22. Alternatively, controller 74 can direct MACs 64 and 68 or encoder/decoders 62 and 70 to generate a jam signal locally and transmit this jam signal over links 60 and 58, respectively.

In operation, uplink module 44 receives message data at link 60, which then passes through encoder/decoder 62 to MAC 64. MAC 64, controller 74, or a combination of MAC 64 and controller 74, detect the amount of message data stored in buffer 66 to determine if the message data received by MAC 64 can be transmitted to local network 34. If buffer 66 has not been saturated, MAC 64 proceeds to store message data in buffer 66, which is then read by MAC 68, passed to encoder/decoder 70, and transmitted over link 58 and IRL 26 to local network 34. If buffer 66 is saturated, then uplink module 44 generates a collision indication, either over collision line 56 or by local generation of a jam signal at MAC 64 or encoder/decoder 62. Transmitting data device 22 receives the jam signal, ceases transmission of the message, and performs a back off procedure that specifies retransmission of the data message after waiting a random period of time.

For messages coming from local network 34, link 58 passes message data to encoder/decoder 70. MAC 68, controller 74, or a combination of MAC 68 and controller 74 detect the amount of message data stored in buffer 72. If buffer 72 is not saturated, MAC 68 stores the message data received from encoder/decoder 70 in buffer 72. MAC 64 then reads the message data from buffer 72 and passes the data to encoder/decoder 62 for transmission to multiport repeater 52 over link 60. If buffer 72 is saturated, MAC 68 or encoder/decoder 70 generate a jam signal for transmission to local network 34 over link 58 and IRL 26.

Uplink module 44 generates a collision indication that is ultimately transformed into a jam signal for transmission to the transmitting data device in either local network 36 or local network 34. Uplink module 44 implements a "backpressure" technique that monitors the amount of message data stored in buffers 66 and 72. When buffers 66 and 72 are relatively clear, MACs 64 and 68 quickly fill and empty buffers 66 and 72 with little inherent delay in transmission of message data. When activity on network 10 increases, uplink module 44 has the flexibility to store several message packets in buffers 66 and 72 and await transmission when activity subsides. This operation of storing message data in buffers 66 and 72 in itself isolates the collision domains of local network 34 and local network 36.

When activity is very heavy and buffers 66 and 72 reach saturation, uplink module 44 informs the transmitting data device, through generation of a collision indication, that the message data cannot be delivered or stored in buffers 66 and 72. No messages will be dropped as long as the transmitting data device receives a collision indication before finishing transmission of the message packet. Consequently, uplink module 44 substantially reduces or eliminates time-out errors that severely degrade performance of network 10.

Uplink module 44 can implement bridging, routing, or filtering functions that inhibit transmission of intra-network messages over IRL 26. Since at least a portion of messages are already stored temporarily in buffers 66 and 72, controller 74 can read the source address of messages received at link 60 to reconstruct a local address table of data devices 22 in local network 36. Over time, controller 74 builds a complete local address table stored in memory 76 of all data devices 22 in local network 36. If uplink module 44 receives message data stored in buffer 66 that includes a destination address that matches an address in the local address table stored in memory 76, controller 74 recognizes the message as an intra-network message and inhibits transmission over IRL 26. By detecting and inhibiting transmission of intra-network messages to local network 34, uplink module 44 reduces the communications traffic over IRL 26, which in turn reduces the number of possible collisions and increases the overall performance of network 10.

Figure 5:
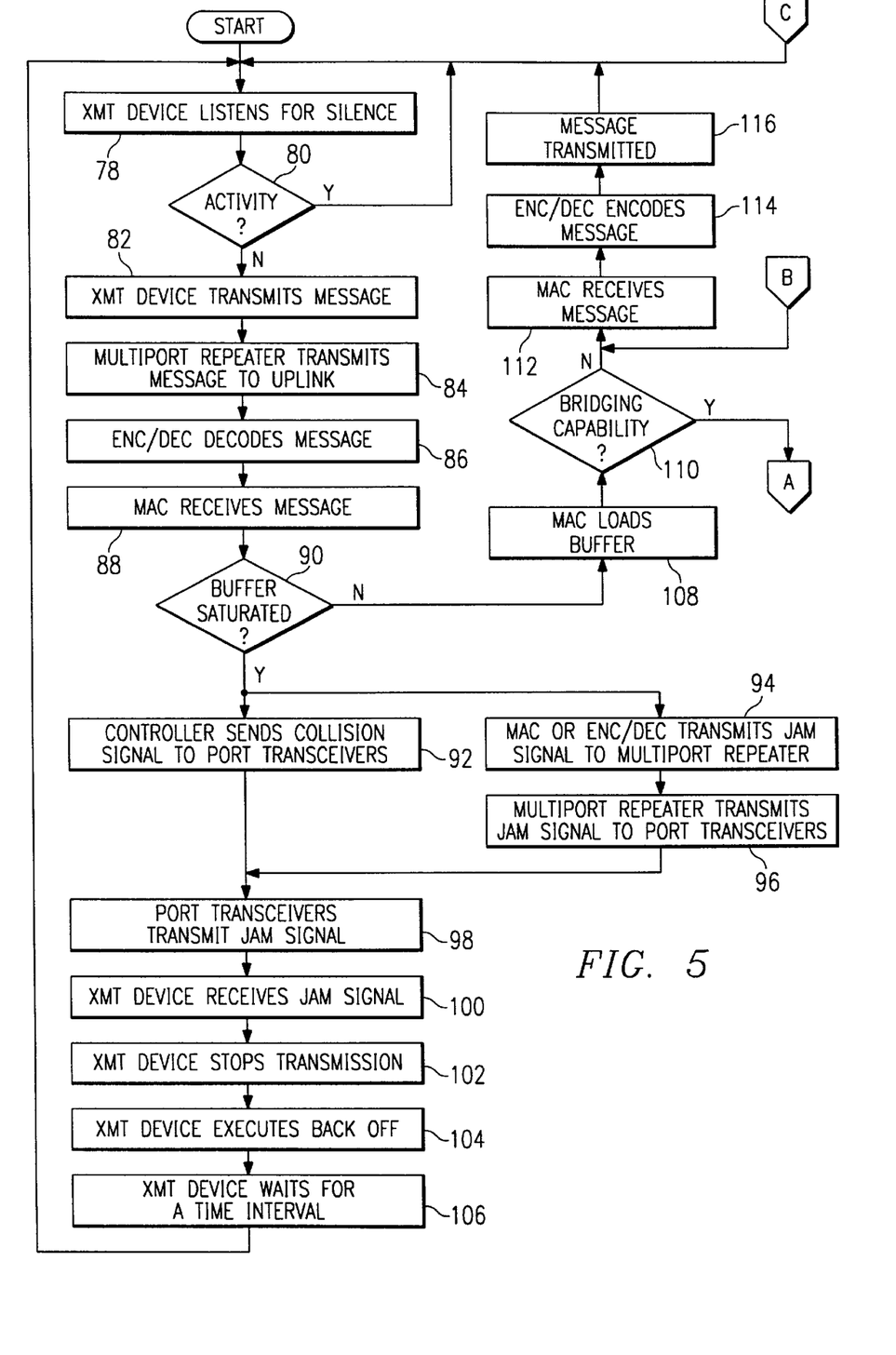
FIG. 5 is a flow chart of a method of transmitting a message using the uplink module.

FIG. 5 is a flow chart illustrating the transmission of message data from transmitting data device 22 in local network 36 through uplink module 44 to local network 34. The process begins when transmitting data device 22 listens for silence at step 78 and, if there is no activity detected at step 80, initiates transmission of a message to repeater 20 at step 82. Multiport repeater 52 receives the message over one of port transceivers 54 and retransmits the message to uplink module 44 at step 84.

At uplink module 44, encoder/decoder 62 decodes the message at step 86 and MAC 64 receives the message at step 88. MAC 64, controller 74, or a combination of MAC 64 and controller 74 determine whether buffer 66 is saturated at step 90. If buffer 66 is saturated, then uplink module 44 generates a collision indication. In one method, controller 74 sends a collision signal over collision line 56 to port transceivers 54 at step 92. In an alternative method, MAC 64 or encoder/decoder 62 locally generate and transmit a jam signal to multiport repeater 52 at step 94. Multiport repeater 52 then broadcasts the jam signal to port transceivers 52 at step 96.

In either method of collision indication, port transceivers 54 transmit the jam signal over local port 46 to transmitting data device 22 at step 98. Transmitting data device 22 receives the jam signal at step 100 and stops transmission of the message at step 102. Transmitting data device 22 then executes a back off procedure at step 104 that specifies waiting an interval of time at step 106 before attempting retransmission of the message at step 78.

If buffer 66 is not saturated at step 90 then MAC 64 loads message data onto buffer 66 at step 108. Uplink module 44 may then implement bridging, routing, or filtering capability at step 110, as described in further detail with reference to FIG. 6. Assuming no bridging, routing, or filtering capability, MAC 68 retrieves message data from buffer 66 at step 112 and passes the data to encoder/decoder 70, which encodes message data for transmission at step 114. The message data is then transmitted at step 116 and the process repeats at step 78.

FIG. 6 is a flow chart illustrating the bridging, routing, or filtering capability of uplink module 44. If uplink module 44 implements bridging, routing, or filtering capability at step 110 then controller 74 reads the source address from message data stored in buffer 66 at step 118. If the source address is not in the local address table stored in memory 76 at step 120, then controller 74 stores the source address in memory 76 at step 122. Controller 74 reads the destination address from message data stored in buffer 66 at step 124. If the destination address matches an address in the local address table stored in memory 76 at step 126, then the message is discarded from buffer 66 and the steps for transmitting the message over IRL 26 at steps 112-116 are bypassed.

Although the present invention has been described with several embodiments, various changes and modifications may be suggested to one skilled in the art, and it is intended that the present invention encompass such changes and modifications as fall within the scope of the appended claims.

What is claimed is:

1. An apparatus for communicating data between a transmitting data device and a receiving data device in a collision domain at a first data rate and a second data rate, the collision domain having a distance dependent upon the data rate, the transmitting and receiving data devices being capable of operating at least at a first data rate, the apparatus comprising:

a first repeater operable to receive and transmit data at a first data rate and a second data rate and connectable to a second repeater, the first and second repeaters positioned between the transmitting data device and the receiving data device to form a collision domain having a first maximum transmission distance at a first data rate and a second maximum transmission distance at a second data rate, the first transmission distance being greater than the second transmission distance, a buffer positioned between the first and second repeaters to form a second collision domain, the buffer being operable to store data for transmission between the collision domains, the first repeater being operable to detect a saturated condition of the buffer, and said first repeater, in response to the saturated condition, further operable to transmit to the transmitting device a collision indication without storing the message in the buffer;

wherein, when data is transmitted at the second data rate, the transmitting data device is positioned from the receiving data device at a distance not greater than the first transmission distance.

2. A computer system comprising:

a first local area network including a first repeater for coupling a first plurality of data devices, said first local area network further including a collision domain;

a second local area network including a second repeater for coupling a second plurality of data devices, said second local are network further including a collision domain;

a first inter-repeater link for coupling said first repeater with said second repeater; and said first repeater including an uplink module connected to said first inter-repeater link, said uplink module for managing communication of data messages transmitted across the collision boundaries of said collision domain of said first local area network and said collision domain of said second local area network.

3. The computer system as recited in claim 2, and further including a third local area network including a second repeater for coupling a third plurality of data devices, said third local are network further including a collision domain;

a second inter-repeater link for coupling said second repeater with said third repeater; and said third repeater including an uplink module for managing communication of data messages across the collision boundaries of said collision domain of said second local area network and said collision domain of said third local are network.

4. The computer system as recited in claim 2, wherein said uplink module of said first repeater includes a buffer for storing data messages.

5. The computer system as recited in claim 4, wherein said uplink module of said first repeater further for generating a collision indication in response to a selected amount of data messages stored in said buffer.

6. The computer system as recited in claim 3, wherein said uplink module of said third repeater includes a buffer for storing data messages.

7. The computer system as recited in claim 6, wherein said uplink module of said third repeater further for generating a collision indication in response to a selected amount of data messages stored in said buffer.

8. A data communication system comprising:

a first local area network including a first repeater for coupling a first plurality of data devices, said first local area network further including a collision domain;

a second local area network including a second repeater for coupling a second plurality of data devices, said second local are network further including a collision domain;

a first inter-repeater link for coupling said first repeater with said second repeater; and said first repeater including an uplink module connected to said first inter-repeater link, said uplink module for managing communication of data messages transmitted across the collision boundaries of said collision domain of said first local area network and said collision domain of said second local area network.

9. The data communication system as recited in claim 8, and further including a third local area network including a second repeater for coupling a third plurality of data devices, said third local are network further including a collision domain;

a second inter-repeater link for coupling said second repeater with said third repeater; and said third repeater including an uplink module for managing communication of data messages across the collision boundaries of said collision domain of said second local area network and said collision domain of said third local are network.

10. The data communication system as recited in claim 9, wherein said uplink module of said first repeater includes a buffer for storing data messages.

11. The data communication system as recited in claim 10, wherein said uplink module of said first repeater further for generating a collision indication in response to a selected amount of data messages stored in said buffer.

12. The data communication system as recited in claim 11, wherein said uplink module of said third repeater includes a buffer for storing data messages.

13. The data communication system as recited in claim 12, wherein said uplink module of said third repeater further for generating a collision indication in response to a selected amount of data messages stored in said buffer.

* * * * *